US008949735B2

(12) United States Patent
Ramachandran et al.

(10) Patent No.: US 8,949,735 B2
(45) Date of Patent: Feb. 3, 2015

(54) DETERMINING SCROLL DIRECTION INTENT

(71) Applicant: Google Inc., Mountain View, CA (US)

(72) Inventors: Vinod K. Ramachandran, Sunnyvale, CA (US); Grace Kloba, Sunnyvale, CA (US); Srikanth Rajagopalan, San Carlos, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 13/783,114

(22) Filed: Mar. 1, 2013

(65) Prior Publication Data

US 2014/0129975 A1     May 8, 2014

Related U.S. Application Data

(60) Provisional application No. 61/722,038, filed on Nov. 2, 2012.

(51) Int. Cl.
*G06F 3/00* (2006.01)
*G06F 3/048* (2013.01)
*G06F 3/0485* (2013.01)
*G06F 3/0488* (2013.01)

(52) U.S. Cl.
CPC ............ *G06F 3/0485* (2013.01); *G06F 3/0488* (2013.01)
USPC ........... 715/784; 715/700; 715/764; 715/773; 715/785; 715/787

(58) Field of Classification Search
None
See application file for complete search history.

(56) References Cited

U.S. PATENT DOCUMENTS

| 4,481,382 A | 11/1984 | Villa-Real |
| 4,644,100 A | 2/1987 | Brenner et al. |
| 4,746,770 A | 5/1988 | McAvinney |

(Continued)

FOREIGN PATENT DOCUMENTS

| EP | 0827094 A2 | 3/1998 |
| EP | 1517228 A2 | 3/2005 |

(Continued)

OTHER PUBLICATIONS

Aliakseyeu, et al., "A computer Support tool for the early stages of architectural design," Interacting with Computers, Jul. 2006, vol. 18, Issue 4, pp. 528-555.

(Continued)

*Primary Examiner* — Matt Kim
*Assistant Examiner* — Yongjia Pan
(74) *Attorney, Agent, or Firm* — McDermott Will & Emery LLP

(57) ABSTRACT

A system for determining scroll direction intent may include one or more processors and a memory. The one or more processors may receive first and second ordered pairs of coordinates of a scroll event. The one or more processors may construct a square that has a first vertex at the first ordered pair of coordinates and an opposite vertex at a third ordered pair of coordinates for which each coordinate has an absolute value that is equal to a maximum absolute coordinate value of the second ordered pair of coordinates, where the signs of the coordinates of the third ordered pair are equivalent to the signs of the corresponding coordinates of the second ordered pair. The one or more processors may determine an intended scroll direction of the scroll event based at least partially on the constructed square and the first and second ordered pair of coordinates.

34 Claims, 8 Drawing Sheets

(56) References Cited

U.S. PATENT DOCUMENTS

| | | | |
|---|---|---|---|
| 5,252,951 A | 10/1993 | Tannenbaum et al. |
| 5,347,295 A | 9/1994 | Agulnick et al. |
| 5,528,260 A | 6/1996 | Kent |
| 5,655,094 A | 8/1997 | Cline et al. |
| 5,805,161 A | 9/1998 | Tiphane |
| 5,825,352 A | 10/1998 | Bisset et al. |
| 5,835,079 A | 11/1998 | Shieh |
| 5,844,547 A | 12/1998 | Minakuchi et al. |
| 5,943,043 A | 8/1999 | Furuhata et al. |
| 5,943,052 A | 8/1999 | Allen et al. |
| 6,278,443 B1 | 8/2001 | Amro et al. |
| 6,310,610 B1 | 10/2001 | Beaton et al. |
| 6,313,853 B1 | 11/2001 | Lamontagne et al. |
| 6,323,846 B1 | 11/2001 | Westerman et al. |
| 6,330,009 B1 | 12/2001 | Murasaki et al. |
| 6,466,203 B2 | 10/2002 | Van Ee |
| 6,492,979 B1 | 12/2002 | Kent et al. |
| 6,504,530 B1 | 1/2003 | Wilson et al. |
| 6,559,896 B1 | 5/2003 | Zwartenkot et al. |
| 6,597,345 B2 | 7/2003 | Hirshberg |
| 6,657,615 B2 | 12/2003 | Harada |
| 6,683,628 B1 | 1/2004 | Nakagawa et al. |
| 6,690,387 B2 | 2/2004 | Zimmerman et al. |
| 6,771,280 B2 | 8/2004 | Fujisaki et al. |
| 6,920,619 B1 | 7/2005 | Milekic |
| 6,972,749 B2 | 12/2005 | Hinckley et al. |
| 7,030,861 B1 | 4/2006 | Westerman et al. |
| 7,038,659 B2 | 5/2006 | Rajkowski |
| 7,079,110 B2 | 7/2006 | Ledbetter et al. |
| 7,084,859 B1 | 8/2006 | Pryor |
| 7,088,344 B2 | 8/2006 | Maezawa et al. |
| 7,093,203 B2 | 8/2006 | Mugura et al. |
| 7,138,983 B2 | 11/2006 | Wakai et al. |
| 7,184,064 B2 | 2/2007 | Zimmerman et al. |
| 7,202,857 B2 | 4/2007 | Hinckley et al. |
| 7,274,377 B2 | 9/2007 | Ivashin et al. |
| D558,757 S | 1/2008 | Andre et al. |
| 7,352,365 B2 | 4/2008 | Trachte |
| 7,408,538 B2 | 8/2008 | Hinckley et al. |
| 7,411,575 B2 | 8/2008 | Hill et al. |
| 7,479,949 B2 | 1/2009 | Jobs et al. |
| 7,545,366 B2 | 6/2009 | Sugimoto et al. |
| 7,576,732 B2* | 8/2009 | Lii | 345/173 |
| 7,619,618 B2 | 11/2009 | Westerman et al. |
| 7,681,142 B2 | 3/2010 | Jarrett et al. |
| 7,705,831 B2* | 4/2010 | Ohshita et al. | 345/173 |
| D618,678 S | 6/2010 | Andre et al. |
| 7,728,812 B2 | 6/2010 | Sato et al. |
| 7,789,697 B2 | 9/2010 | Fiennes |
| 7,817,145 B2* | 10/2010 | Klishko et al. | 345/173 |
| RE41,922 E | 11/2010 | Gough et al. |
| 7,863,533 B2 | 1/2011 | Hamel et al. |
| 7,884,804 B2 | 2/2011 | Kong |
| 7,912,501 B2 | 3/2011 | Johnson et al. |
| 8,300,958 B2* | 10/2012 | Zhou | 382/232 |
| 8,411,738 B2* | 4/2013 | Zhou et al. | 375/240.01 |
| 8,643,606 B2* | 2/2014 | Chiu et al. | 345/173 |
| 2002/0036618 A1 | 3/2002 | Wakai et al. |
| 2002/0056575 A1 | 5/2002 | Keely et al. |
| 2002/0158838 A1 | 10/2002 | Smith et al. |
| 2003/0016252 A1 | 1/2003 | Noy et al. |
| 2003/0184593 A1 | 10/2003 | Dunlop |
| 2004/0012572 A1 | 1/2004 | Sowden et al. |
| 2004/0021676 A1 | 2/2004 | Chen et al. |
| 2004/0056837 A1 | 3/2004 | Koga et al. |
| 2004/0160420 A1 | 8/2004 | Baharav et al. |
| 2005/0012723 A1 | 1/2005 | Pallakoff |
| 2005/0052427 A1 | 3/2005 | Wu et al. |
| 2005/0057524 A1 | 3/2005 | Hill et al. |
| 2005/0088418 A1 | 4/2005 | Nguyen |
| 2005/0190144 A1 | 9/2005 | Kong |
| 2005/0193351 A1 | 9/2005 | Huoviala |
| 2005/0237308 A1 | 10/2005 | Autio et al. |
| 2006/0001650 A1 | 1/2006 | Robbins et al. |
| 2006/0001652 A1 | 1/2006 | Chiu et al. |
| 2006/0007176 A1 | 1/2006 | Shen |
| 2006/0007178 A1 | 1/2006 | Davis |
| 2006/0022955 A1 | 2/2006 | Kennedy |
| 2006/0026521 A1 | 2/2006 | Hotelling et al. |
| 2006/0028428 A1 | 2/2006 | Dai et al. |
| 2006/0031786 A1 | 2/2006 | Hillis et al. |
| 2006/0033751 A1 | 2/2006 | Keely et al. |
| 2006/0044259 A1 | 3/2006 | Hotelling et al. |
| 2006/0047386 A1 | 3/2006 | Kanevsky et al. |
| 2006/0049920 A1 | 3/2006 | Sadler et al. |
| 2006/0055662 A1 | 3/2006 | Rimas-Ribikauskas et al. |
| 2006/0101354 A1 | 5/2006 | Hashimoto et al. |
| 2006/0132460 A1 | 6/2006 | Kolmykov-Zotov et al. |
| 2006/0164399 A1 | 7/2006 | Cheston et al. |
| 2006/0181519 A1 | 8/2006 | Vernier et al. |
| 2006/0202953 A1 | 9/2006 | Pryor et al. |
| 2006/0227116 A1 | 10/2006 | Zotov |
| 2006/0236263 A1 | 10/2006 | Bathiche et al. |
| 2006/0253793 A1 | 11/2006 | Zhai et al. |
| 2006/0267959 A1 | 11/2006 | Goto et al. |
| 2006/0277116 A1 | 12/2006 | Lewis |
| 2006/0288313 A1 | 12/2006 | Hillis |
| 2006/0294472 A1 | 12/2006 | Cheng et al. |
| 2007/0030253 A1 | 2/2007 | Chu et al. |
| 2007/0040812 A1 | 2/2007 | Tang et al. |
| 2007/0061126 A1 | 3/2007 | Russo et al. |
| 2007/0118400 A1 | 5/2007 | Morita et al. |
| 2007/0120834 A1 | 5/2007 | Boillot |
| 2007/0130532 A1 | 6/2007 | Fuller et al. |
| 2007/0150826 A1 | 6/2007 | Anzures et al. |
| 2007/0152984 A1 | 7/2007 | Ording et al. |
| 2007/0177803 A1 | 8/2007 | Elias et al. |
| 2007/0220444 A1 | 9/2007 | Sunday et al. |
| 2007/0236475 A1 | 10/2007 | Wherry |
| 2007/0252821 A1 | 11/2007 | Hollemans et al. |
| 2007/0259716 A1 | 11/2007 | Mattice et al. |
| 2007/0273668 A1 | 11/2007 | Park et al. |
| 2008/0046836 A1* | 2/2008 | Maruyama et al. | 715/784 |
| 2008/0122786 A1 | 5/2008 | Pryor et al. |
| 2008/0225013 A1 | 9/2008 | Muylkens et al. |
| 2009/0292989 A1 | 11/2009 | Matthews et al. |
| 2010/0045705 A1 | 2/2010 | Vertegaal et al. |
| 2012/0212407 A1* | 8/2012 | Tanaka | 345/156 |
| 2013/0106744 A1* | 5/2013 | Asakura | 345/173 |
| 2013/0257911 A1* | 10/2013 | Karasudani | 345/684 |

FOREIGN PATENT DOCUMENTS

| | | |
|---|---|---|
| EP | 2455850 A2 | 5/2012 |
| GB | 2347200 A | 8/2000 |
| GB | 2351215 A | 12/2000 |
| JP | 5-091169 | 4/1993 |
| JP | 2000-163031 A | 6/2000 |
| JP | 2004-071767 A | 3/2004 |
| JP | 2004-303019 A | 10/2004 |
| JP | 2005-044036 A | 2/2005 |
| KR | 2002-0095992 A | 12/2002 |
| KR | 2007-0064869 A | 6/2007 |
| KR | 10-2009-0103212 | 10/2009 |
| WO | WO-99/38149 | 7/1999 |
| WO | WO-02/01338 | 1/2002 |
| WO | WO-02/05422 | 1/2002 |
| WO | WO-02/08881 | 1/2002 |
| WO | WO-03/060622 A2 | 7/2003 |
| WO | WO-2004/111816 A2 | 12/2004 |
| WO | WO-2005/008444 A2 | 1/2005 |
| WO | WO-2005/018129 A2 | 2/2005 |
| WO | WO-2005/064587 A2 | 7/2005 |
| WO | WO-2005/074268 | 8/2005 |
| WO | WO-2006/020305 A2 | 2/2006 |
| WO | WO-2006/126055 A2 | 11/2006 |
| WO | WO-2007/032843 A2 | 3/2007 |

OTHER PUBLICATIONS

Baguley, "Nokia's Small, Svelte, Internet-Savvy PDA," PC World Jan. 31, 2006.

(56) References Cited

OTHER PUBLICATIONS

Bordovsky, et al, "Interpreting Commands from a Graphical User Interface," International Technology Disclosures, Jun. 1991, vol. 9, No. 6.

Cheng, et al., "Navigation Control and Gesgture Recognition Input Device for Small, Portable User Interfaces," Synaptics Inc of San Jose CA, 2004.

Computergram International, "Next-Generation Sharp Organiser to carry Pen Interface," No. 1955, Jul. 2, 1992.

Dachselt, et al., "Three-dimensional menus: A survey and taxonomy," Computers and Graphics, Jan. 2007, vol. 31, pp. 53-65.

Davidson, et al., "Synthesis and control on large scale multi-touch sensing displays," Proceedings of the 2006 Conference on New Interfaces for Musical Expression (NIME 2006).

Dietz, et al., "DiamontTouch: A multi-user touch technology," Proc ACM UIST, (ACM 2001) reprinted as MERL Technical Report No. TR2003-125.

Electronic Engineering Times, "Screen Can Tell Finger From Stylus," Jul. 1995, No. 858, p. 67.

Esenther, et al., DiamondTouch SDK: Support for Multi-User, Multi-Touch Applications, (MERL 2002), printed as MERL Technical Report No. TR2002-48.

Esenther, et al., "Multi-User, Multi-Touch Games on DiamondTouch with the DTFlash Toolkit," printed as MERL Technical Report No. TR2005-105 (2005).

Foo, J "Jackito-Tactile Digital Assistant," CNET Asia, Mar. 5, 2005, 3 pages.

Forlines, et al., "Multi-user, Multi-display Interaction with a Single-User, Single Geospatial Application," USIT '06.

Fukuchi, "Concurrent Manipulation of Multiple Components on Graphical User Interface," Tokyo Institute of Technology, 2006 (Thesis).

Fukuchi, et al., "Interaction techniques for SmartSkin," Proceedings of UIST'02 (2002).

Gillespie, "Novel Touch Screens for Hand-Held Devices," Information Display, 2002, vol. 18, No. 2, 5 pages.

"Google Maps API GoogleCode," Google Inc., <http://googlescom/apis/maps>, 1 page, printed Apr. 10, 2008.

Han, "Low-cost multi-touch sensing through frustrated total internal reflection," Proceedings of the 18th Annual ACM Symposium on User Interface Software and Technology (USIT 2005).

Han, "Multi-touch interaction wall," ACM SIGGRAPH 2006, Emerging Technologies, Article 25.

Han, "Unveiling the genius of multi-touch interface Design Video on TED.com" Aug. 1, 2006, <http://www.ted.com/talks/jeff_han_demos_his_breakthrough_touchsreen.html>.

Hoover, "Computer GUI Revolution Continues with Microsoft Surface's Touch Screen, Object Recognition," Information Week, May 30, 2007, <http:www.informationweek.com/news/mobility/showArticle.jhtml?articleiD=199703468>.

IBM, Method to Disable and Enable a Touch Pad Pointing Device or Tablet Input Device Using Gestures, Jun. 2002, 3 pages.

Jin, et al., "GIA: design of a gesture-based interaction photo album," Personal and Ubiquitous Computing, 2004, vol. 8, pp. 227-233.

Johnson, "Gestures Redefine Computer Interface," Electronic Engineering Times, Oct. 1996, No. 924, p. 42.

Karlson, et al., "AppLens and LaunchTile: Two Designs for One-Handed Thumb Use on Small Devices," Proceedings of the 2005 ACM Conference, Apr. 2005.

Korpela, "Using inline frames (iframe elements) to embed documents into HTML documents," Sep. 25, 2006, <http://www.cs.tut.fi/~jkorpela/html/iframe/html>.

Narayanaswamy, et al., "User Interface for a PCS Smart Phone," Multimedia Computing and Systems, IEEE Conference 1999, vol. 1.

Piquepaille, R., "Exclusive Interview with Jakito's Makers," Technology Trends, Jul. 21, 2004.

Piquepaille, R "Forget the PDA, Here Comes the TDA," Sidebars, Jul. 12, 2004.

Poon, et al., "Gestural User Interface Technique for Controlling the Playback of Sequential Media," Xerox Disclosure Journal, Mar./Apr. 1994, vol. 19, No. 2, pp. 187-190.

PR Newswire, "FingerWorks Announces a Gesture Keyboard for Apple PowerBooks," Jan. 27, 2004, 2 pages >http://www.beststuff.com/computers/fingerworks-announces-a-gesture-keyboard-for-apple-powerbooks.html>.

PR Newswire, "FingerWorks Announces the ZeroForce iGesture ad," Feb. 18, 2003, 2 pages.

Rekimoto, "SmartSkin: An Infrastructure for Freehand Manipulation on Interactive Surfaces," Proceedings of the SIGCHI Conference on Human Factors in Computing Systems: Changing our world, Changing ourselves, 2002.

Rubine, "Specifying Gestures by Example," Computer Graphics, Jul. 1991, vol. 25, No. 4.

Rubine, "The Automatic Recognition of Gestures," 1991, 285 pages.

"Sprint Power Vision Smart Device Treo 700 b Palm," Getting Started Guide, Sprint, 2006.

Tse, et al., "Enabling Interaction with single user applications through speech and gestures on a multi-user tabletop," AVI 2006, MERL Technical Report No. TR2005-130.

Wellner, "Adaptive Thresholding for the Digital Desk," Technical Report, Rank Xerox Research Centre, Cambridge Laboratory, 1993 <http://citeseerx.ist.psu.edu/viewdoc/download?doi=10.1.1.71.8970&rep=rep1&type=pdf>.

Wellner, "Interacting with paper on the digital desk," communications of the ACM, Jul. 1993, vol. 36, No. 7.

Wellner, "Self Calibration for the DigitalDesk," Technical Report, Rank Xerox Research Centre, 1993 <http://citeseerx.ist.psu.edu/viewdoc/download?doi=10.1.1.44.7371&rep=rep1&type=pdf>.

Wellner, The DigitalDesk calculator: tangible manipulation on a desk top display. UIST 1991: 27-33 <http://www.idemployee.id.tue.nl/g.w.m.rauterberg/publications/wellner-91.pdf>.

Westerman, "Hand Tracking, Finger Identification, and Chordic Manipulation on a Multi-Touch Surface," Dissertation, University of Delaware, 1999 <http://www.ece.udel.edu!-westerma!main.pdf>.

Westermann, et al., "MultiTouch: A New Tactile 2-D Gesture Interface for Human Computer Interaction," Proceedings of the Human Factors and Ergonomics Society 45th Annual Meeting, 2001, pp. 632-636.

\* cited by examiner

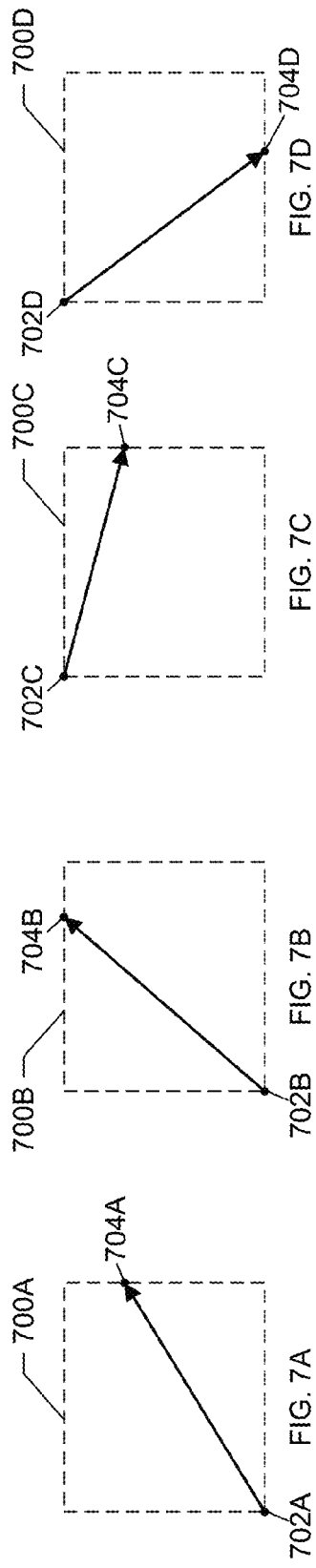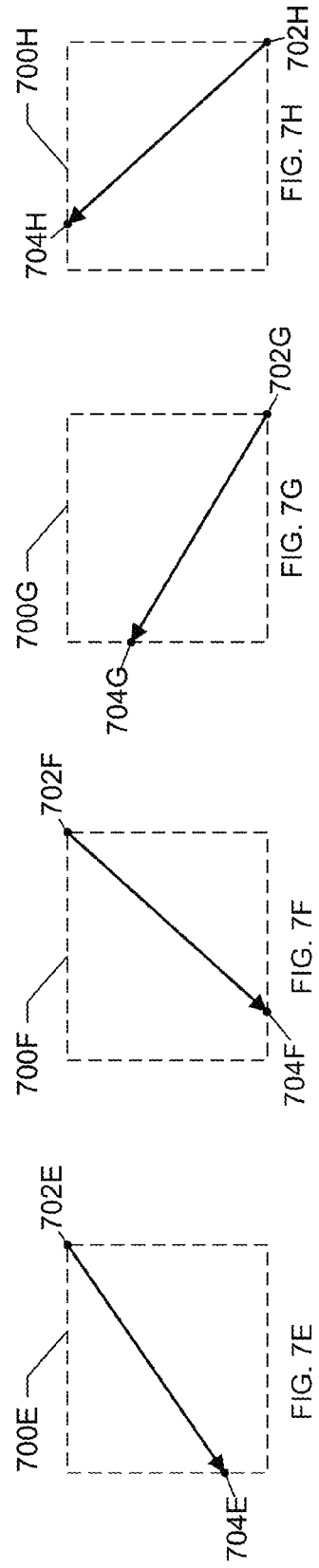

DETERMINING SCROLL DIRECTION INTENT

CROSS-REFERENCE TO RELATED APPLICATIONS

The present application claims the benefit of U.S. Provisional Patent Application Ser. No. 61/722,038, entitled "Determining Scroll Direction Intent," filed on Nov. 2, 2012, which is hereby incorporated by reference in its entirety for all purposes.

TECHNICAL FIELD

The present description relates generally to scroll direction intent, and more particularly, but not exclusively, to determining scroll direction intent.

BACKGROUND

Mobile devices may be used to browse content, such as web content. Since the screen size of a mobile device may be smaller than that of a desktop computer, the content may, in many instances, extend beyond the visible portion of the screen. In these instances, a user may need to scroll to view the content. For example, if the mobile device has a touch interface, such as a touchscreen, a user may be able to scroll vertically by dragging (swiping) their finger in the up-down direction relative to the content displayed on the mobile device, and a user may be able to scroll horizontally by dragging (swiping) their finger in the left-right direction relative to the content displayed on the mobile device. A user may interact similarly with a touch interface, such as a touchpad or a trackpad, of a computing device, such as a laptop or desktop computer, in order to scroll the content displayed on the computing device. However, in one or more instances, the actual motion of the user's finger on the touch interface may not be exactly vertical or exactly horizontal.

SUMMARY

The disclosed subject matter relates to a method for determining scroll direction intent. The method may include receiving a first ordered pair of coordinates of a scroll event and a second ordered pair of coordinates of the scroll event. The method may further include determining a first area of a first region of a square that is divided into the first region and a second region by a line segment comprising endpoints of the first ordered pair of coordinates and the second ordered pair of coordinates, wherein the square comprises a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates. The method may further include determining a second area of the second region of the square, determining, by a processor, an intended scroll direction of the scroll event based at least in part on the first area of the first region and the second area of the second region, and providing the intended scroll direction of the scroll event.

The disclosed subject matter also relates to a system for determining scroll direction intent. The system may include one or more processors and a memory including instructions that, when executed by the one or more processors, cause the one or more processors to: receive a first ordered pair of coordinates of a scroll event and a second ordered pair of coordinates of the scroll event, determine a first area of a first region of a square that is divided into the first region and a second region by a line segment comprising endpoints of the first ordered pair of coordinates and the second ordered pair of coordinates, wherein the square comprises a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates, determine a second area of the second region of the square, determine a ratio of the first area to the second area, determine an intended scroll direction of the scroll event based at least in part on whether the ratio satisfies a threshold, and provide the intended scroll direction of the scroll event.

The disclosed subject matter also relates to a machine-readable medium embodying instructions that, when executed by a machine, allow the machine to perform a method for determining scroll direction intent. The method may include receiving a first ordered pair of coordinates of a scroll event and a second ordered pair of coordinates of the scroll event. The method may further include constructing a square comprising a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates. The method may further include dividing the square into a first region and a second region based on a line segment comprising endpoints of the first ordered pair of coordinates and the second ordered pair of coordinates and determining a first area of the first region and a second area of the second region. The method may further include determining, by a processor, an intended scroll direction of the scroll event based at least in part on the first area of the first region and the second area of the second region, and providing the intended scroll direction of the scroll event.

The disclosed subject matter also relates to a method for determining scroll direction intent. The method includes receiving a first ordered pair of coordinates of a scroll event and a second ordered pair of coordinates of the scroll event. The method further includes determining a square that is divided into a first region and a second region by a line segment comprising endpoints of the first ordered pair of coordinates and the second ordered pair of coordinates, the first region comprising a triangle and a rectangle that share a common edge, wherein the square comprises a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates. The method further includes determining, by a processor, an intended scroll direction of the scroll event based at least in part on a position of the rectangle of the first region relative to the common edge, and providing the intended scroll direction of the scroll event.

The disclosed subject matter also relates to a method for determining scroll direction intent. The method includes receiving a first ordered pair of coordinates of a scroll event and a second ordered pair of coordinates of the scroll event, the first ordered pair of coordinates characterized by first signs and the second ordered pair of coordinates characterized by second signs. The method further includes constructing a square comprising a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, the third ordered pair of coordinates characterized by third signs that coincide with the second signs. The method further includes determining, by a processor, an intended scroll direction of the scroll event based at least in part on a whether a line that passes through the first ordered pair of coordinates and the second ordered pair of coordinates intersects with a vertical edge of the square or a horizontal edge of the square, and providing the intended scroll direction of the scroll event.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the claims listed below. However, for purpose of explanation, several embodiments of the subject technology are set forth in the following figures.

FIGS. 7A-H illustrate example squares that may be constructed by an electronic device to determine scroll direction intent in accordance with one or more implementations.

DETAILED DESCRIPTION

Figure 1:
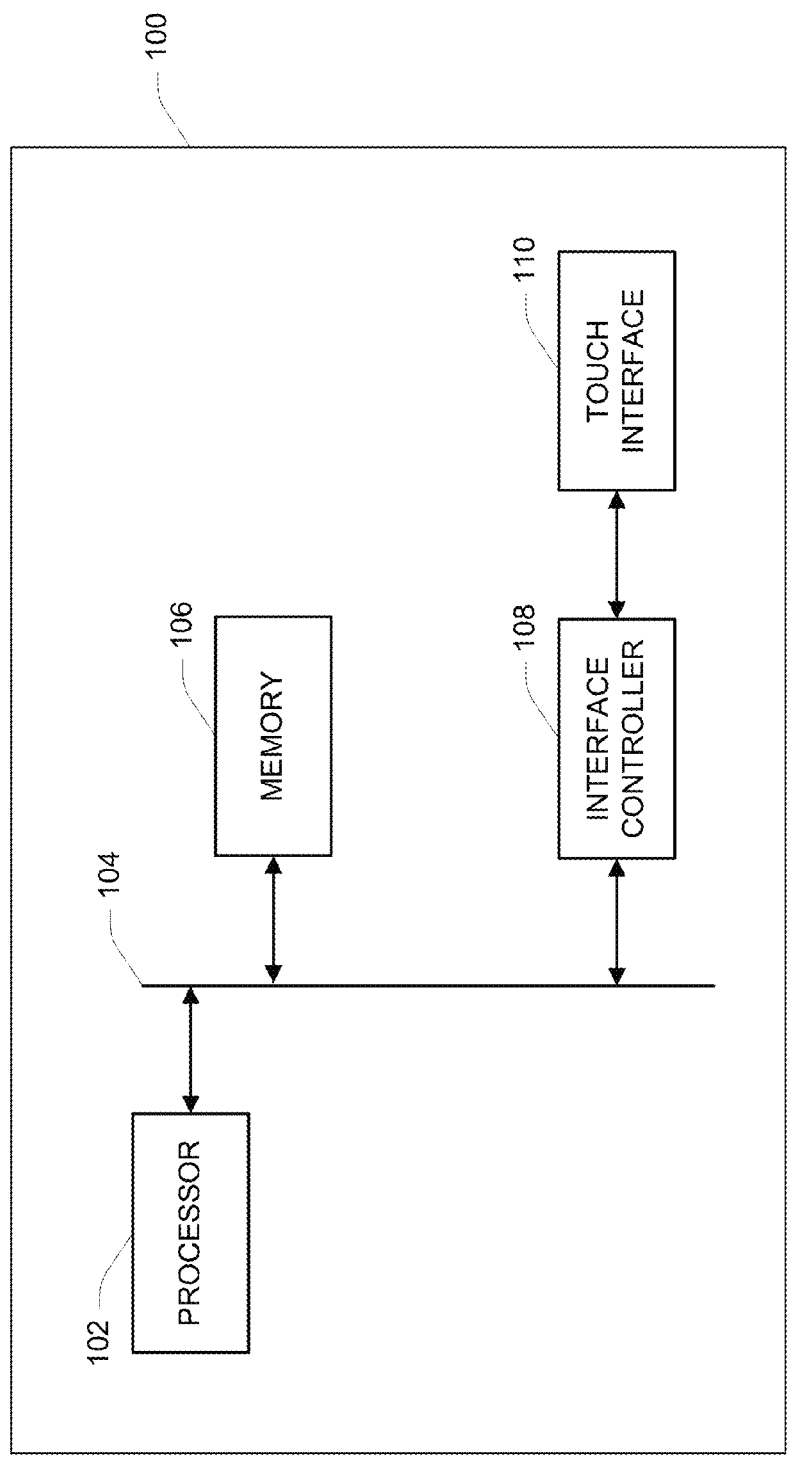
FIG. 1 illustrates an example electronic device that may implement a system for determining scroll direction intent in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In some instances, well-known structures and components are shown in block diagram form in order to avoid obscuring the concepts of the subject technology.

The subject system for determining scroll direction intent determines an intended scroll direction based at least in part on the areas of geometric shapes, e.g. triangles and squares and/or a line that intersects, and/or shares a common point with, a geometric shape. Since the area of a triangle or square can be determined by a multiplication operation, the subject system may be less computationally complex, and therefore may require fewer computational resources, than systems that determine scroll direction intent using trigonometric functions, such as arctangent functions, sin functions, etc.

In the subject system for determining scroll direction intent, the system receives a starting ordered pair of coordinates of a scroll event and an ending ordered pair of coordinates of the scroll event. In one or more implementations, the system may normalize the ordered pairs of coordinates relative to the starting ordered pair of coordinates. The system determines a maximum absolute coordinate value of the ending ordered pair of coordinates, e.g. the coordinate of the pair that has the highest absolute value. The system constructs a square that has a first vertex at the starting ordered pair of coordinates, a second vertex at an ordered pair of coordinates for which both coordinates have an absolute value that is equal to the maximum absolute coordinate value of the ending ordered pair of coordinates, and a side that passes through the ending ordered pair of coordinates. The sign of each coordinate of the second vertex is set such that the side of the square passes through the ending ordered pair of coordinates and/or such that the sign of each coordinate of the second vertex coincides with the sign of the corresponding coordinate of the ending ordered pair of coordinates. The system divides the square into two regions as defined by a line segment having endpoints at the starting and ending pairs of coordinates. The system determines the areas of the two regions and determines the intended scroll direction based at least in part on the areas of the regions and/or based at least in part on whether the line segment shares a point in common with a vertical edge (or side) of the square or a horizontal edge (or side) of the square, as is discussed further below.

FIG. 1 illustrates an example electronic device 100 which may implement a system for determining scroll direction intent in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The electronic device 100 may be any device capable of receiving directional user input, such as touch input, pointing device input, e.g. mouse input, or generally any directional user input. In one or more implementations, the electronic device 100 may be, for example, a desktop computer, a laptop computer, a tablet computer, a mobile phone, a personal digital assistant (PDA), a smartphone, a television, a monitor, a navigation device, or any device capable of receiving directional user input.

The electronic device 100 includes a processor 102, a bus 104, a memory 106, such as a computer-readable medium or a machine readable medium, an interface controller 108, and a touch interface 110. The processor 102 may be configured to execute computer instructions stored in a machine readable medium, such as the memory 106. The processor 102 may be a central processing unit (CPU). The processor 102 can be any commercially available processors, including a single processor or a multi-core processor. The bus 104 collectively represents system, peripheral, and chipset buses that communicatively connect the internal components of the electronic device 100, some of which may not be shown in FIG. 1. In one or more implementations, the bus 104 communicatively connects the processor 102 with one or more of the memory 106, the interface controller 108, and/or the touch interface 110.

The interface controller 108 may be communicatively coupled to the touch interface 110 and may detect gestures (e.g., press actions, swipe actions, different sequences of touch actions, etc.) with respect to the touch interface 110. The touch interface 110 may include an array of touch sensors. In one or more implementations, the touch interface 110 may also include a display device that may display multiple-pixel graphics according to signals from the processor 102. Alternatively, the electronic device 100 may include a separate display device that is not shown in FIG. 1. The touch sensors may indicate a location of a user input when the user touches a top surface the touch interface 110. If the touch interface 110 includes a display device, the touch sensors may be arranged below or above the display device. In one or more implementations, the touch interface 110 may be a touchpad, a trackpad, or a touchscreen, such as a capacitive panel, a surface capacitance panel, a projected capacitance panel, a resistive touchscreen panel, a surface acoustic wave panel, an acoustic pulse recognition panel, an infrared panel, a strain gauge panel, an optical imaging panel, or a dispersive signal technology panel.

In operation, the interface controller 108 periodically samples signals from the touch interface 110 and provides the processor 102 with signals indicating detected contacts and the locations of the detected contacts. For example, the interface controller 108 may determine from the touch sensors that an area on the surface of the touch interface 110 is in contact with a user's appendage, such as a finger. The interface controller 108 may convert an indication of the contacted area into ordered pairs of coordinates (e.g., horizontal coordinates (x) and vertical coordinates (y)) and provide the ordered pairs of coordinates to the processor 102. In one or more implementations, the touch interface 110 may logically be divided into points, where each point has a horizontal coordinate (x) and a vertical coordinate (y). The touch interface 110 may have an origin at any point on the touch interface 110, such as at the lower-left hand corner of the touch interface 110 or at the upper-left hand corner of the touch interface 110.

The processor 102 identifies, based on the received signals, whether touch events, such as scroll events, have occurred. The processor 102 may also determine the rate at which the touch events occurred, as well as other characteristics of the touch events. The sequence of the touch events, the location at which the touch events occurred, the rate at which the touch events occurred and/or other characteristics of the touch events are used to determine a type of the touch events, such as a scroll event.

For example, based on user input the processor 102 may trigger, or may receive, an indication of a scroll event. The indication of the scroll event may include the ordered pair of coordinates of the starting point of the scroll event, and the ordered pair of coordinates of the ending point of the scroll event. The processor 102 may determine a square that has a first vertex at the starting point of the scroll event, a second vertex at an ordered pair of coordinates for which both coordinates have an absolute value that is equal to a maximum absolute coordinate value of the ordered pair of coordinates of the ending point of the scroll event, and a side that passes through the ending point of the scroll event. The processor 102 may set the sign of each coordinate of the second vertex to coincide with the sign of each corresponding coordinate of the ordered pair of coordinates of the ending point of the scroll event. The processor 102 may determine the areas of two regions of the square that are defined by a line segment running through the square that has endpoints at the starting and ending points of the scroll event. The processor 102 may determine, based at least in part on the areas of the two regions of the square and/or whether the line segment shares a point in common with a vertical edge of the square or a horizontal edge of the square, the intended scroll direction of the user. The processor 102 may then cause content being displayed to the user to be scrolled in the determined intended scroll direction. Example processes for determining scroll direction intent are discussed further with respect to FIGS. 2 and 3, and example use cases are discussed further with respect to FIGS. 4-6.

In one or more implementations, a single user gesture, such as a swipe gesture to scroll, may be separated into several individual touch events, such as several individual scroll events. For example, the gesture may be separated into individual events based on the amount of time during the gesture, such as every 1 milliseconds, or based on the distance of the gesture, such as every 0.1 inches. The processor 102 may receive an indication of each of the individual scroll events. If the processor 102 receives multiple scroll events within a short time interval, e.g. if the user is scrolling quickly, the processor 102 may determine the intended scroll direction of the $n^{th}$ received scroll event based on one or more previous scroll events. For example, if the processor 102 receives three scroll events in rapid succession, and the processor 102 determines that the intended scroll direction of the first two scroll events is the vertical direction, the processor 102 may determine that the intended scroll direction of the third scroll event is the vertical direction without performing any area calculations, e.g. based solely on the third scroll event's temporal proximity to the first two scroll events that were determined to be the vertical direction.

Figure 2:
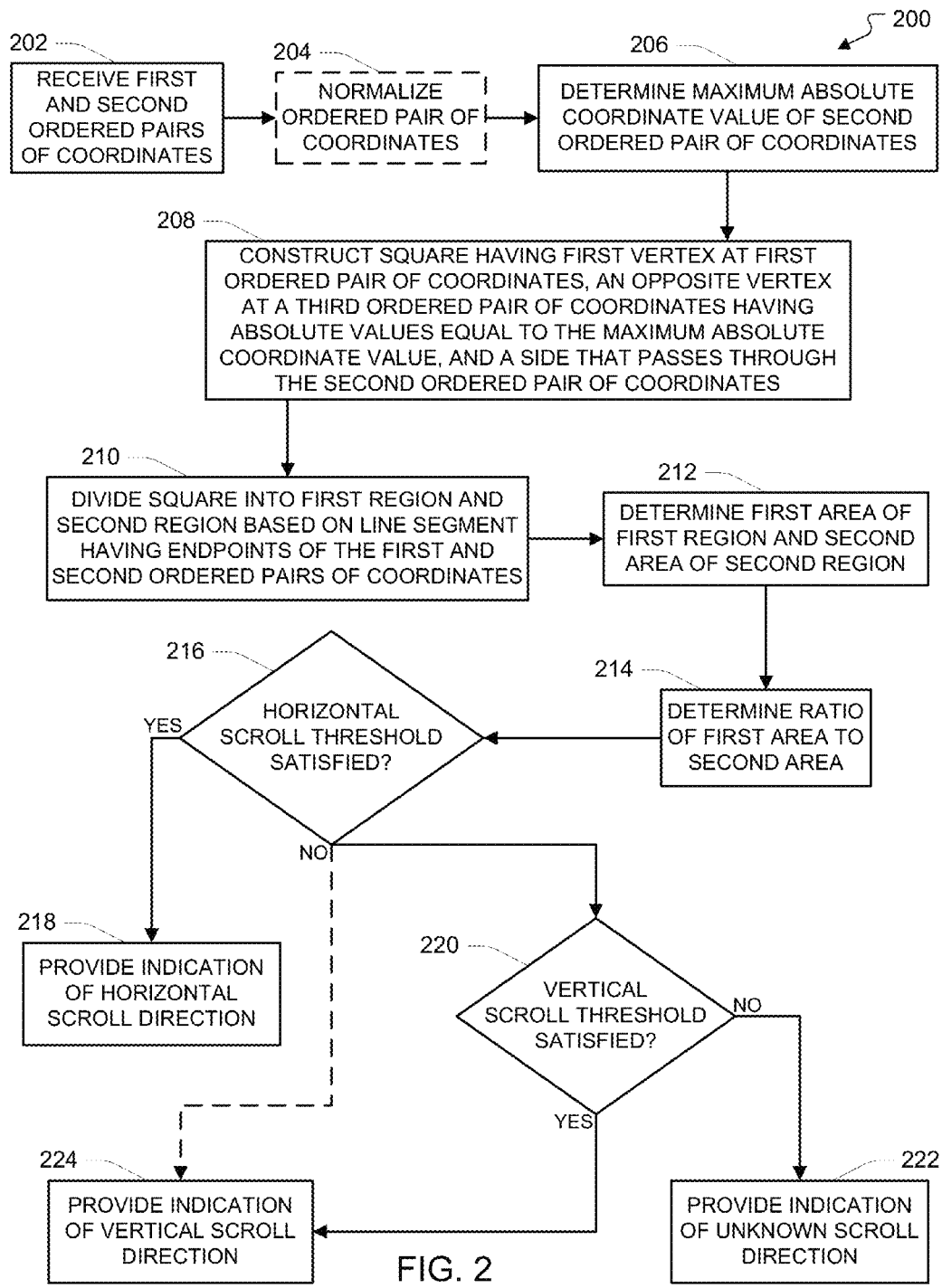
FIG. 2 illustrates a flow diagram of an example process for determining scroll direction intent in accordance with one or more implementations.

FIG. 2 illustrates a flow diagram of example process 200 for determining scroll direction intent in accordance with one or more implementations. For explanatory purposes, example process 200 is described herein with reference to example electronic device 100 of FIG. 1; however, example process 200 is not limited to example electronic device 100 of FIG. 1. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

In block 202, the processor 102 receives a first ordered pair of coordinates and a second ordered pair of coordinates, such as pairs of coordinates that indicate a starting point and an ending point of a scroll event. Alternatively, or in addition, multiple scroll events may be associated with the first and second pair of coordinates. For example, a scroll event may be generated for every 0.1 inches between the first and second ordered pair of coordinates, or a scroll event may be generated for every certain number of pixels between the first and second ordered pair of coordinates. Thus, an aggregation of temporally consecutive scroll events may be associated with the first and second ordered pairs of coordinates.

In block 204, the processor 102 normalizes the first ordered pair of coordinates and the second ordered pair of coordinates. For example, the processor 102 may subtract (or add) the first coordinate of the first ordered pair of coordinates from the first coordinate of the second ordered pair of coordinates, the processor 102 may subtract (or add) the second coordinate of the first ordered pair of coordinates from the second coordinate of the second ordered pair of coordinates, and the processor 102 may then set both coordinates of the first ordered pair of coordinates to zero. The processor 102 may use the normalized pairs of coordinates to perform the remaining blocks 206-224. Alternatively, or in addition, the processor 102 may not normalize the ordered pairs of coordinates, e.g. if both coordinates of the first ordered pair of coordinates received by the processor 102 have a value of zero.

In block 206, the processor 102 determines a maximum absolute coordinate value of the second ordered pair of coordinates, e.g. the ending point of the scroll event. For example, the processor 102 may determine whether the vertical coordinate or the horizontal coordinate of the second ordered pair of coordinates has a greater absolute value.

In block 208, the processor 102 constructs a square that has a vertex at the first ordered pair of coordinates, e.g. the starting point of the scroll event, an opposite vertex at a third ordered pair of coordinates for which each coordinate has an absolute value equal to the absolute maximum coordinate value, and a side that passes through the second ordered pair of coordinates. For example, if the second ordered pair of coordinates is (2, −5), the maximum absolute coordinate value of the second ordered pair of coordinates would be 5. Thus, each coordinate of the third ordered pair of coordinates would have an absolute value of 5. The sign of each coordinate of the third ordered pair of coordinates is set such that a side of the square passes through the second ordered pair of coordinates and/or such that the sign of each coordinate of the third ordered pair of coordinates is equivalent to the sign of the corresponding coordinate of the second ordered pair of coordinates. Since the second ordered pair of coordinates is (2, −5), the third ordered pair of coordinates, e.g. the vertex opposite to the vertex at the first ordered pair of coordinates, would be set to (5, −5), such that a side of the square passes through the second ordered pair of coordinates.

In block 210, the processor 102 divides the square into a first region and a second region based on a line segment that has endpoints at the first and second ordered pair of coordinates, e.g. the starting point and the ending point of the scroll event. In one or more implementations, the shape of the first region may be a triangle and the shape of the second region may be a triangle adjacent to a rectangle, or vice-versa. Alternatively, both the first region and the second region may be triangles. In one or more implementations, a vertical axis through the first set of coordinates may include an edge of the first region.

In block 212, the processor 102 determines the first area of the first region and the second area of the second region. For example, if the first region is a triangle, the processor 102 may determine the area of the triangle, e.g., by multiplying the height of the triangle by one-half of the base of the triangle. Thus, the processor 102 may determine the first area of the first region by a multiplication operation.

If the second region is a triangle adjacent to a rectangle, the processor 102 may determine the area of the rectangle by multiplying the width of the rectangle times the height of the rectangle and the processor 102 may determine the area of the triangle as previously discussed. In one or more implementations, the area of the triangle of the second region may be equivalent to the area of the triangle of the first region. In these implementations, the processor 102 may not need to calculate the area of the triangle of the second region but instead may use the area of the triangle of the first region as the area of the triangle of the second region. The processor 102 may then add the area of the triangle of the second region to the area of the rectangle of the second region to determine the second area of the second region. Thus, the processor 102 may determine the second area of the second region using multiplication and addition operations.

In block 214, the processor 102 determines a ratio of the first area to the second area. For example, the processor 102 may divide the first area by the second area to determine the ratio. In block 216, the processor 102 determines whether a horizontal scroll threshold is satisfied. The horizontal scroll threshold may be based on one or more criteria, or a combination of criteria, that relate to: the areas of the regions, the content that is being displayed on the electronic device 100, gesture patterns of the user, such as swipe movement patterns that have previously been provided by the user, an orientation (e.g., portrait, landscape, etc.) of the electronic device 100, or an output of a sensor of the electronic device 100, such as proximity sensor, a motion sensor, an ambient light sensor, a moisture sensor, or a gyroscope sensor.

For example, in the instance where a vertical axis through the first set of coordinates includes an edge of the first region and the horizontal scroll threshold is only based on an area criterion, the horizontal scroll threshold may be satisfied when the ratio of the areas is greater than a value, such as one, e.g. when the first area of the first region is greater than the second area of the second region. In another example, if the ratio is equal to one, e.g. the first area of the first region is equal to the second area of the second region, the processor 102 may determine that the horizontal scroll threshold is satisfied, e.g. that the user intended to scroll in a horizontal direction, if the content being displayed on the electronic device 100 is flowing horizontally.

In another example, if the horizontal scroll threshold is based on an area criterion and a content criterion, the horizontal scroll threshold may be set to a value that incorporates both the ratio of the areas and a characteristic of the content being displayed, such as the direction with the most content to be viewed. For example, if the most content to be viewed is in the vertical direction, the horizontal scroll threshold may be set to 1.2, and therefore may be satisfied when the first area of the first region is greater than the second area of the second region by a factor of 1.2.

If, in block 216, the processor 102 determines that the horizontal scroll threshold is satisfied, the processor 102 moves to block 218. In block 218, the processor 102 provides an indication of the horizontal scroll direction, such as to a display module that controls the content displayed on the electronic device 100. The display module may then cause the content being displayed on the electronic device 100 to scroll in the horizontal direction, e.g. in the horizontal direction from the first ordered pair of coordinates to the second ordered pair of coordinates. Alternatively, or in addition, the processor 102 may cause the content to scroll in the horizontal direction.

In one or more implementations, the display module and/or the processor 102 may cause the content to scroll in the horizontal direction at a rate that is based at least in part on the velocity of the user's gesture that generated the scroll event, e.g. a swipe action. For example, if the user performed a fling gesture, the display module and/or the processor 102 may cause the content to scroll rapidly in the horizontal direction.

If, in block 216, the processor 102 determines that the horizontal scroll threshold is not satisfied, the processor 102 moves to block 220. In block 220, the processor 102 determines whether a vertical scroll threshold is satisfied. The vertical scroll threshold may be based on one or more criteria, or a combination of criteria, that relate to: the areas of the regions, the content that is being displayed on the electronic device 100, gesture patterns of the user, such as swipe movement patterns that have previously been provided by the user, an orientation of the electronic device 100, or an output of a sensor of the electronic device 100, such as proximity sensor, a motion sensor, an ambient light sensor, a moisture sensor, or a gyroscope sensor.

For example, in the instance where a vertical axis through the first set of coordinates includes an edge of the first region and the vertical scroll threshold is only based on an area criterion, the vertical scroll threshold may be satisfied when the ratio of the areas is less than a value, such as one, e.g. when the second area of the second region is greater than the first area of the first region. In another example, if the ratio is equal to one, e.g. the first area of the first region is equal to the second area of the second region, the processor 102 may determine that the vertical scroll threshold is satisfied, e.g. that the user intended to scroll in a vertical direction, if the content being displayed on the electronic device 100 is flowing vertically.

If, in block 220, the processor 102 determines that the vertical scroll threshold is satisfied, the processor 102 moves to block 224. In block 224, the processor 102 provides an indication of the vertical scroll direction, such as to a display module that controls the content displayed on the electronic device 100. The display module may then cause the content being displayed on the electronic device 100 to scroll in the vertical direction, e.g. in the vertical direction from the first ordered pair of coordinates to the second ordered pair of coordinates. Alternatively, or in addition, the processor 102 may cause the content to scroll in the vertical direction.

In one or more implementations, the display module and/or the processor 102 may cause the content to scroll in the vertical direction at a rate that is based at least in part on the velocity of the user's gesture that generated the scroll event, e.g. a swipe action. For example, if the user performed a fling gesture, the display module and/or the processor 102 may cause the content to scroll rapidly in the vertical direction.

If, in block 220, the processor 102 determines that the vertical scroll threshold is not satisfied, the processor 102 moves to block 222. In block 222, the processor 102 may provide an indication that the intended scroll direction is unknown or cannot be determined. In this instance, the display module and/or the processor 102 may not cause the displayed content to scroll in any direction. Alternatively, the display module and/or the processor 102 may cause the displayed content to scroll in the direction of the previous scroll event. Alternatively, or in addition, the display module and/or the processor 102 may cause the displayed content to scroll in a direction that is determined based at least in part on a characteristic of the displayed content. For example, the processor 102 may cause the displayed content to scroll in the direction with the most content to be viewed.

Alternatively, or in addition, the processor 102 may determine whether the intended scroll direction is the horizontal direction or the vertical direction based on only one threshold. For example, the processor 102 may determine that the intended scroll direction is the horizontal direction when the threshold is satisfied and the processor 102 may determine that the intended scroll direction is the vertical direction when the threshold is not satisfied, or vice-versa.

Figure 3:
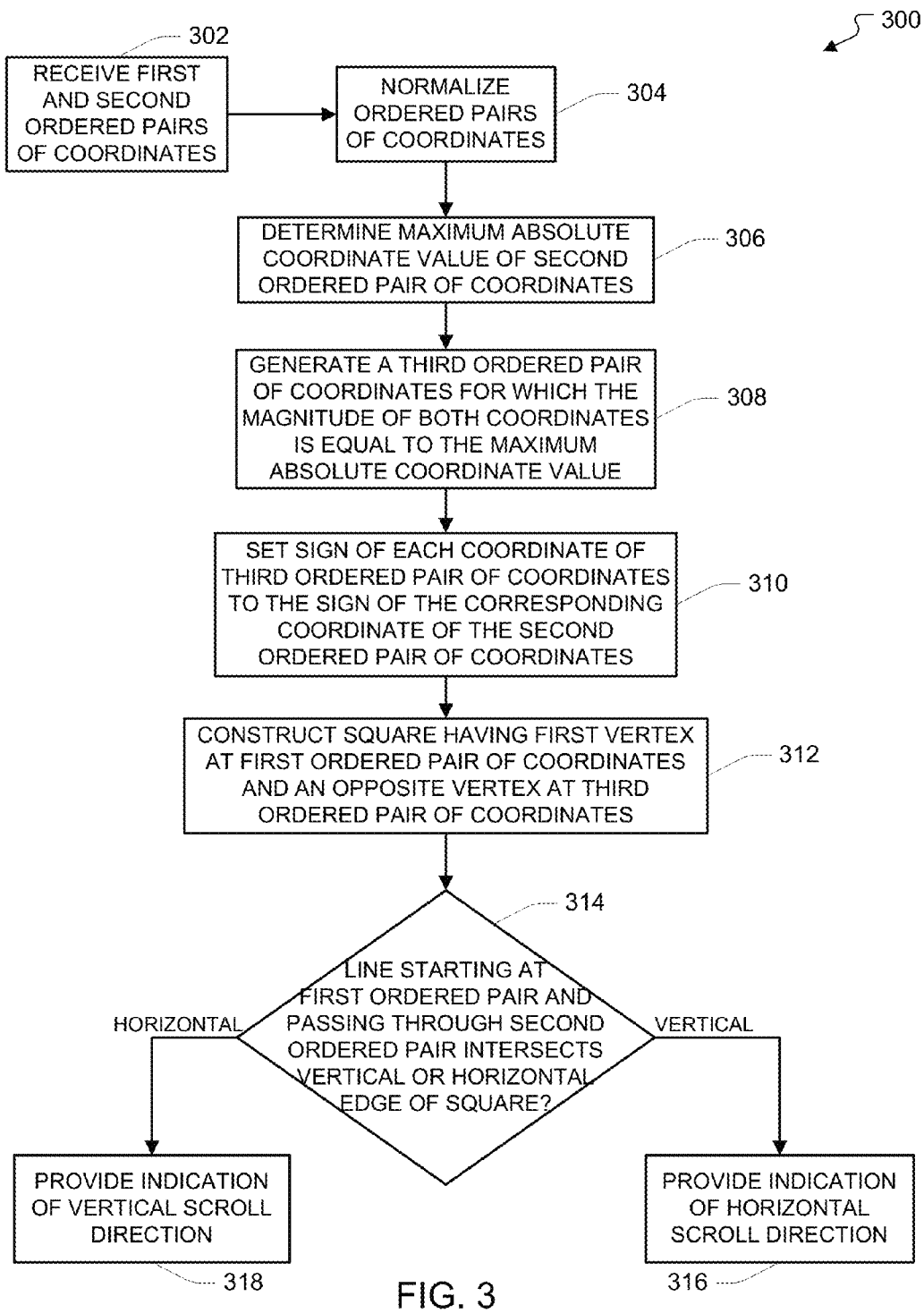
FIG. 3 illustrates a flow diagram of example process for determining scroll direction intent in accordance with one or more implementations.

FIG. 3 illustrates a flow diagram of example process 300 for determining scroll direction intent in accordance with one or more implementations. For explanatory purposes, example process 300 is described herein with reference to example electronic device 100 of FIG. 1; however, example process 300 is not limited to example electronic device 100 of FIG. 1. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In block 302, the processor 102 receives a first ordered pair of coordinates and a second ordered pair of coordinates, such as pairs of coordinates that indicate a starting point and an ending point of a scroll event. Alternatively, or in addition, multiple scroll events may be associated with the first and second pair of coordinates. For example, a scroll event may be generated for every 0.1 inches between the first and second ordered pair of coordinates, or a scroll event may be generated for every certain number of pixels between the first and second ordered pair of coordinates. Thus, an aggregation of temporally consecutive scroll events may be associated with the first and second ordered pairs of coordinates.

In block 304, the processor 102 normalizes the first ordered pair of coordinates and the second ordered pair of coordinates. For example, the processor 102 may set both coordinates of the first ordered pair of coordinates (that coincides with the starting point of the scroll event) to zero and may normalize the second ordered pair of coordinates relative to the normalized first ordered pair of coordinates. For example, if both coordinates of the first ordered pair of coordinates have positive values, e.g. (3, 5), the processor 102 may subtract the values of the first ordered pair of coordinates from the corresponding coordinates of the second ordered pair of coordinates, such as subtracting 3 from the horizontal coordinate of the second ordered pair of coordinates and subtracting 5 from the vertical coordinate of the second ordered pair of coordinates. Alternatively, or in addition, the processor 102 may not normalize the ordered pairs of coordinates, e.g. if both coordinates of the first ordered pair of coordinates received by the processor 102 in block 302 have a value of zero.

In block 306, the processor 102 determines a maximum absolute coordinate value of the second ordered pair of coordinates, e.g. the ending point of the scroll event. For example, the processor 102 may determine whether the vertical coordinate or the horizontal coordinate of the second ordered pair of coordinates has a greater absolute value.

In block 308, the processor 102 generates a third ordered pair of coordinates for which the magnitude of each coordinate is equivalent to the maximum absolute coordinate value determined in block 306. In block 310, the processor 102 sets the sign of each coordinate of the third ordered pair of coordinates to coincide with the sign of the corresponding coordinate of the second ordered pair of coordinates. For example, if the first coordinate, e.g. horizontal coordinate, of the second ordered pair of coordinates has a positive value and the second coordinate, e.g. vertical coordinate, of the second ordered pair of coordinates has a negative value, then the processor 102 sets the sign of the first coordinate, e.g. horizontal coordinate, of the third ordered pair of coordinates as positive, and the processor 102 sets the sign of the second coordinate, e.g. vertical coordinate, of the third ordered pair of coordinates as negative.

In block 312, the processor 102 constructs a square having a first vertex at the first ordered pair of coordinates, e.g. the starting point of the scroll event, and an opposite vertex at the third ordered pair of coordinates. In block 314, the processor 102 determines whether a line that starts at the first ordered pair of coordinates, e.g. the starting point of the scroll event, and passes through, or ends at, the second ordered pair of coordinates, e.g. the ending point of the scroll event, intersects, and/or shares a common point with, a vertical edge of the square constructed in block 312, e.g. an edge of the square that is parallel to a vertical axis, or a horizontal edge of the square constructed in block 312, e.g. an edge of the square that is parallel to a horizontal axis. For explanatory purposes, the ordered pairs of coordinates are described herein as having first coordinates as horizontal coordinates and second coordinates as vertical coordinates; however, in one or more implementations, the first coordinates of the ordered pairs of coordinates may be vertical coordinates, and the second coordinates of the ordered pairs of coordinates may be horizontal coordinates.

If, in block 314, the processor 102 determines that the line that starts at the first ordered pair of coordinates and passes through, or ends at, the second ordered pair of coordinates, intersects, and/or shares a common point with, a horizontal edge of the square, the processor 102 moves to block 318. In block 318, the processor 102 provides an indication that the intended scroll direction is the vertical direction, such as to a display module that controls the content displayed on the electronic device 100. The display module may then cause the content being displayed on the electronic device 100 to scroll in the vertical direction, e.g. in the vertical direction from the first ordered pair of coordinates to the second ordered pair of coordinates. Alternatively, or in addition, the processor 102 may cause the content to scroll in the vertical direction.

In one or more implementations, the display module and/or the processor 102 may cause the content to scroll in the vertical direction at a rate that is based at least in part on the velocity of the user's gesture that generated the scroll event, e.g. a swipe action. For example, if the user performed a fling gesture, the display module and/or the processor 102 may cause the content to scroll rapidly in the vertical direction.

If, in block 314, the processor 102 determines that the line that starts at the first ordered pair of coordinates and passes through, or ends at, the second ordered pair of coordinates, intersects, and/or shares a common point with, a vertical edge of the square, the processor 102 moves to block 316. In block 316, the processor 102 provides an indication that the intended scroll direction is the horizontal direction, such as to a display module that controls the content displayed on the electronic device 100. The display module may then cause the content being displayed on the electronic device 100 to scroll in the horizontal direction, e.g. in the horizontal direction from the first ordered pair of coordinates to the second ordered pair of coordinates. Alternatively, or in addition, the processor 102 may cause the content to scroll in the horizontal direction.

In one or more implementations, the display module and/or the processor 102 may cause the content to scroll in the horizontal direction at a rate that is based at least in part on the velocity of the user's gesture that generated the scroll event, e.g. a swipe action. For example, if the user performed a fling gesture, the display module and/or the processor 102 may cause the content to scroll rapidly in the horizontal direction.

In one or more implementations, if the line that starts at the first ordered pair of coordinates and passes through, or ends at, the second ordered pair of coordinates passes through, or ends at, a vertex of the square, as opposed to an edge of the square, the processor 102 may indicate that the intended scroll direction is indeterminable, and/or the processor 102 may select either the horizontal direction or the vertical direction as the intended scroll direction. Alternatively, the display module and/or the processor 102 may cause the displayed content to scroll in the direction of the previous scroll event. Alternatively, or in addition, the display module and/or the processor 102 may cause the displayed content to scroll in a direction that is determined based at least in part on a characteristic of the displayed content, or of the electronic device 102, such as the orientation of the electronic device 102. For example, the processor 102 may cause the displayed content to scroll in the direction with the most content to be viewed.

Figure 4:
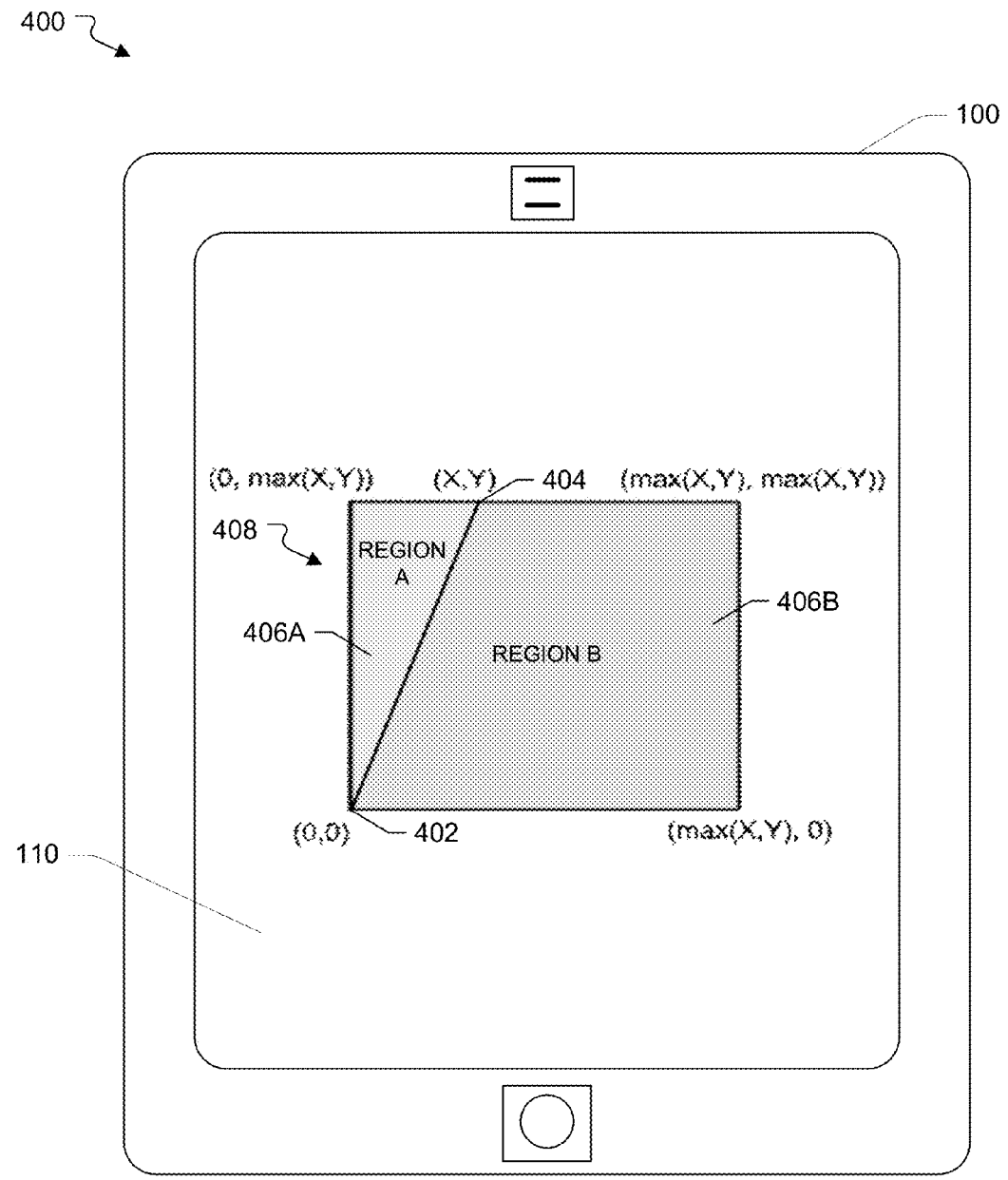
FIG. 4 illustrates an example use case of an example electronic device implementing a system for determining scroll direction intent in accordance with one or more implementations.

FIG. 4 illustrates an example use case 400 for an example electronic device 100 implementing a system for determining scroll direction intent in accordance with one or more implementations. For explanatory purposes, the example use case 400 is described herein with reference to the example electronic device 100 of FIG. 1; however, the example use case 400 is not limited to the example electronic device 100 of FIG. 1.

The use case 400 includes a first ordered pair of coordinates 402 that indicate the starting point of a touch event on the touch interface 110 of the electronic device 100, a second ordered pair of coordinates 404 that indicate the ending point of the touch event on the touch interface 110 of the electronic device 100, a first region 406A of a square 408 and a second region 406B of the square 408.

In operation, the processor 102 may normalize the first and second ordered pair of coordinates 402, 404, if desired. The processor 102 may then determine the square 408 based on the first ordered pair of coordinates 402 and the second ordered pair of coordinates 404. For example, a first vertex of the square 408 may be at the first ordered pair of coordinates 402 and a second vertex of the square 408 may be at a third ordered pair of coordinates for which both coordinates are equal to the maximum coordinate of the second ordered pair of coordinates 404. The processor 102 may divide the square 408 into the first region 406A and the second region 406B based on a line segment that has endpoints at the first ordered pair of coordinates 402 and the second ordered pair of coordinates 404. In the use case 400, a vertical axis through the first set of coordinates 402 includes an edge of the first region 406A.

The processor 102 may determine the first area of the first region 406A (a triangle) by multiplying the height of the triangle by one-half of the base of the triangle. For example, the processor 102 may determine the height of the triangle of the first region 406A as the absolute value of the difference between the vertical coordinates, e.g. the second coordinates, of the first and second ordered pair of coordinates 402, 404. The processor 102 may determine the base of the triangle of the first region 406A as the absolute value of the difference between the horizontal coordinates, e.g. the first coordinates, of the first and second ordered pair of coordinates 402, 404. The processor 102 may then determine the area of the first region 406A by multiplying the height by one-half of the base.

The processor 102 may split the second region 406B into two geometric shapes, a triangle and a rectangle. For example, the processor 102 may split the second region 406B by the vertical axis of the second ordered pair of coordinates 404. In this example, the area of the triangle of the second region 406B may be equivalent to the area of the first region 406A. Thus, the processor 102 may not need to calculate the area of the triangle of the second region 406B.

The processor 102 may determine the area of the rectangle of the second region 406B by multiplying the height of the rectangle by the width of the rectangle. In the use case 400, the processor 102 may determine the height of the rectangle of the second region 406B as the absolute value of the difference between the vertical coordinates, e.g. the second coordinates, of the first and second ordered pair of coordinates 402, 404. Alternatively, the processor 102 may use the previously determined height of the triangle of the first region 406A as the height of the rectangle of the second region 406B. The processor 102 may determine the width of the rectangle of the second region 406B as the absolute value of the difference between the maximum coordinate of the second ordered pair of coordinates 404 and the horizontal coordinate, e.g. the first coordinate, of the second ordered pair of coordinates 404. The processor 102 may then determine the area of the rectangle of the second region 406B by multiplying the height by the width. The processor 102 may then determine the area of the second region 406B by adding the area of the triangle of the second region 406B to the area of the rectangle of the second region 406B.

The processor 102 may determine the ratio of the areas by dividing the first area of the first region 406A by the second area of the second region 406B. Since a vertical axis through the first set of coordinates 402 includes an edge of the first region 406A, and since the ratio of the areas of the use case 400 is less than one, the processor 102 may determine that the intended scroll direction in the use case 400 is the vertical direction.

In one or more implementations, the processor 102 may determine a ratio of the area of the rectangle of the second region 406B to the area of the triangle of the second region 406B, such as by dividing the area of the rectangle of the second region 406B by the area of the triangle of the second region 406B. The processor 102 may then compare the ratio to a threshold to determine whether the intended scroll direction is the vertical direction or the horizontal direction.

Alternatively, or in addition, the processor 102 may also analyze the position of the rectangle of the second region 406B with respect to the first triangle or second triangle. For example, the processor 102 may analyze the position of the rectangle with respect to the edge of the triangle of the second region 406B that is shared with the rectangle of the second region 406B and/or with respect to the region formed by the combination of the triangle of the first region 406A and the triangle of the second region 406B. The processor may incorporate the position of the rectangle into the determination of the intended scroll direction, e.g. in combination with the ratio of the area of the rectangle of the second region 406B to the area of the triangle of the second region 406B. For example, the rectangle of the second region 406B being positioned to the left or to the right of the shared edge of the triangle of the second region 406B may be indicative of, and/or inferential of, the vertical direction, while the rectangle of the second region 406B being positioned above or below the shared edge of the triangle of the second region 406B may be indicative of, and/or inferential of, the horizontal direction. Thus, the positioning of the rectangle of the second region 406B to the right of shared edge of the triangle of the second region 406B in FIG. 4 may indicate that the intended scroll direction is the vertical direction.

Figure 5:
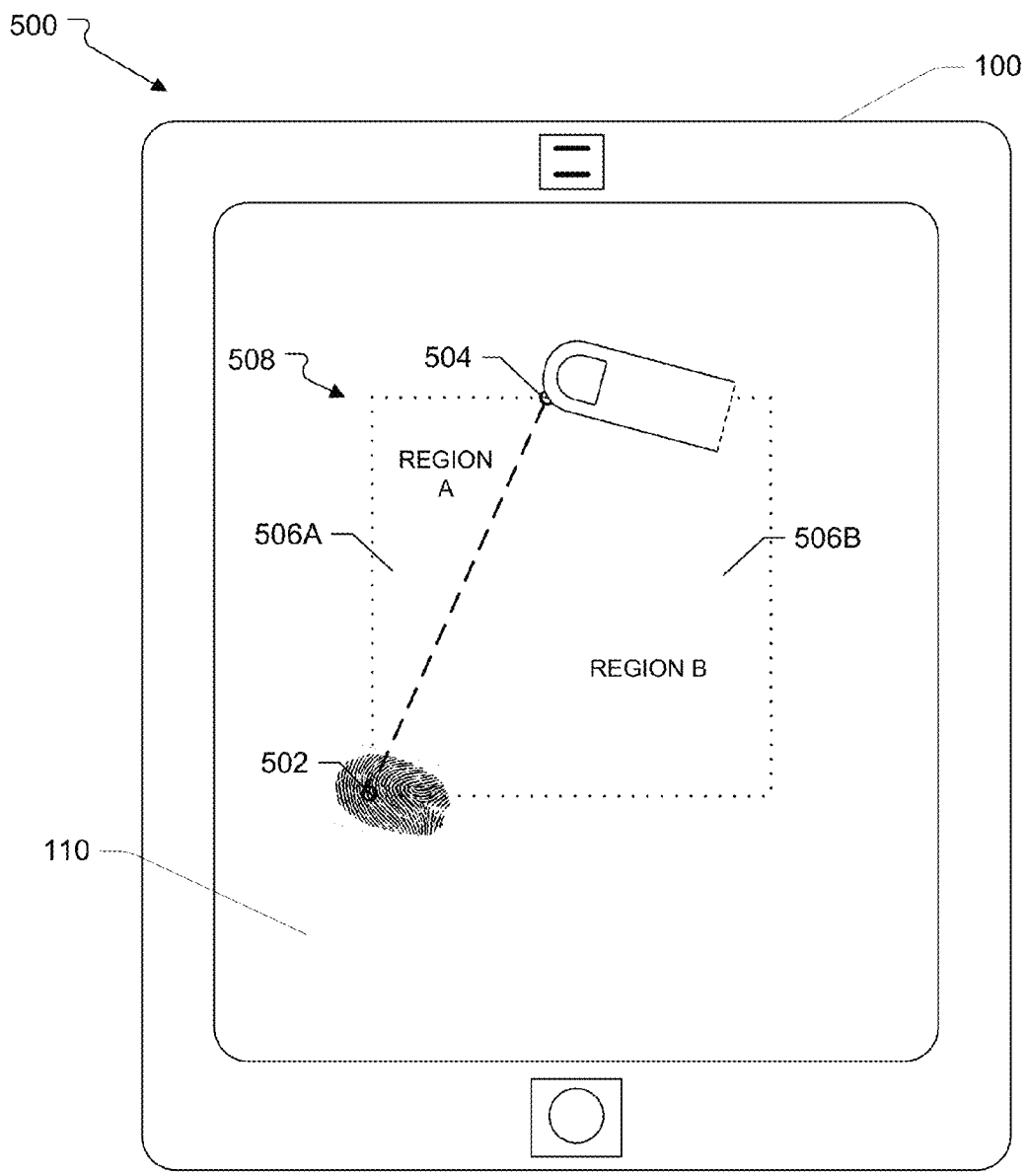
FIG. 5 illustrates an example use case of an example electronic device implementing a system for determining scroll direction intent in accordance with one or more implementations.

FIG. 5 illustrates an example use case 500 for an example electronic device 100 implementing a system for determining scroll direction intent in accordance with one or more implementations. For explanatory purposes, the example use case 500 is described herein with reference to the example electronic device 100 of FIG. 1; however, the example use case 500 is not limited to the example electronic device 100 of FIG. 1.

The use case 500 includes a first ordered pair of coordinates 502 that indicate the starting point of a touch event on the touch interface 110 of the electronic device 100, a second ordered pair of coordinates 504 that indicate the ending point of the touch event on the touch interface 110 of the electronic device 100, a first region 506A of a square 508 and a second region 506B of the square 508. The second region 506B of the square 508 includes a rectangle and a triangle. In the use case 500, a vertical axis through the first set of coordinates 502 includes an edge of the first region 506A.

The processor 102 may determine the areas of the first and second regions 506A-B, as previously discussed with respect to FIG. 2 and FIG. 4. The processor 102 may determine the ratio of the areas by dividing the first area of the first region 506A by the second area of the second region 506B. Since a vertical axis through the first set of coordinates 502 includes an edge of the first region 506A, and since the ratio of the areas of the use case 500 is less than one, the processor 102 may determine that the intended scroll direction in the use case 500 is the vertical direction. In addition, the positioning of the rectangle of the second region 506B to the right of the shared edge of the triangle of the second region 506B in FIG. 5 may also or alternatively indicate that the intended scroll direction is the vertical direction.

Figure 6:
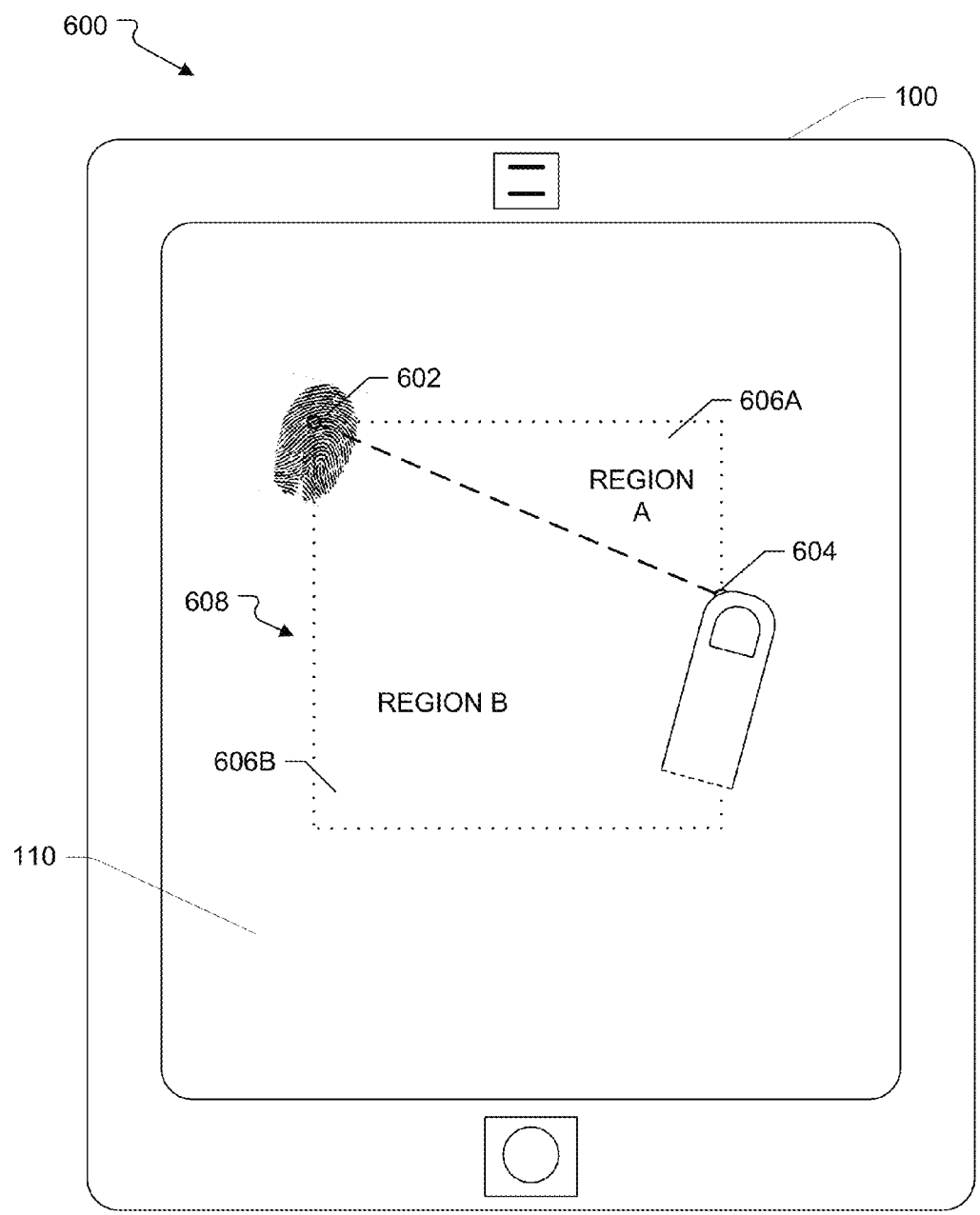
FIG. 6 illustrates an example use case of an example electronic device implementing a system for determining scroll direction intent in accordance with one or more implementations.

FIG. 6 illustrates an example use case 600 for an example electronic device 100 implementing a system for determining scroll direction intent in accordance with one or more implementations. For explanatory purposes, the example use case 600 is described herein with reference to the example electronic device 100 of FIG. 1; however, the example use case 600 is not limited to the example electronic device 100 of FIG. 1.

The use case 600 includes a first ordered pair of coordinates 602 that indicate the starting point of a touch event on the touch interface 110 of the electronic device 100, a second ordered pair of coordinates 604 that indicate the ending point of the touch event on the touch interface 110 of the electronic device 100, a first region 606A of a square 608 and a second region 606B of the square 608. The second region 606B of the square 608 includes a rectangle and a triangle. In the use case 600, a vertical axis through the first set of coordinates 602 includes an edge of the second region 606B.

The processor 102 may determine the areas of the first and second regions 606A-B, as previously discussed with respect to FIG. 2 and FIG. 4. The processor 102 may determine the ratio of the areas by dividing the first area of the first region 606A by the second area of the second region 606B. Since a vertical axis through the first set of coordinates 602 includes an edge of the second region 606B, and since the ratio of the areas of the use case 600 is greater than one, the processor 102 may determine that the intended scroll direction in the use case 600 is the horizontal direction. In addition, the positioning of the rectangle of the second region 606B below the shared edge of the triangle of the second region 606B in FIG. 6 may also or alternatively indicate that the intended scroll direction is the horizontal direction.

FIGS. 7A-H illustrate example squares 700A-H that may be constructed by an electronic device to determine scroll direction intent in accordance with one or more implementations. For explanatory purposes, the generation and processing of the example squares 700A-H are described herein with reference to the example electronic device 100 of FIG. 1;

however, the generation and processing of the example squares 700A-H are not limited to the example electronic device 100 of FIG. 1.

The squares 700A-H are constructed based on a first ordered pairs of coordinates 702A-H of a scroll event and a second ordered pairs of coordinates 704A-H of a scroll event. For example, the first ordered pairs of coordinates 702A-H may correspond to starting points of scroll events and the second ordered pairs of coordinates 704A-H may correspond to ending points of scroll events. In one or more implementations, the first ordered pairs of coordinates 702A-H may be normalized such that both coordinates of the first ordered pairs of coordinates 702A-H has a value of zero.

In operation, with respect to FIG. 7A, the processor 102 may receive the first ordered pair of coordinates 702A and the second ordered pair of coordinates 704A and may construct the square 700A based on the received first and second ordered pair of coordinates 702A, 704A, such as in the manner described above with respect to FIG. 2 and/or FIG. 3. Since the line that starts at the first ordered pair of coordinates 702A and passes through, and/or ends at, the second ordered pair of coordinates 704A intersects, and/or shares a common point with, a vertical edge of the square 700A, e.g. an edge of the square 700A that is parallel to the vertical axis, the processor 102 determines that the intended scroll direction is the horizontal direction.

In operation, with respect to FIG. 7B, the processor 102 may receive the first ordered pair of coordinates 702B and the second ordered pair of coordinates 704B and may construct the square 700B based on the received first and second ordered pair of coordinates 702B, 704B, such as in the manner described above with respect to FIG. 2 and/or FIG. 3. Since the line that starts at the first ordered pair of coordinates 702B and passes through, and/or ends at, the second ordered pair of coordinates 704B intersects, and/or shares a common point with, a horizontal edge of the square 700B, e.g. an edge of the square 700B that is parallel to the horizontal axis, the processor 102 determines that the intended scroll direction is the vertical direction.

In operation, with respect to FIG. 7C, the processor 102 may receive the first ordered pair of coordinates 702C and the second ordered pair of coordinates 704C and may construct the square 700C based on the received first and second ordered pair of coordinates 702C, 704C, such as in the manner described above with respect to FIG. 2 and/or FIG. 3. Since the line that starts at the first ordered pair of coordinates 702C and passes through, and/or ends at, the second ordered pair of coordinates 704C intersects, and/or shares a common point with, a vertical edge of the square 700C, e.g. an edge of the square 700C that is parallel to the vertical axis, the processor 102 determines that the intended scroll direction is the horizontal direction.

In operation, with respect to FIG. 7D, the processor 102 may receive the first ordered pair of coordinates 702D and the second ordered pair of coordinates 704D and may construct the square 700D based on the received first and second ordered pair of coordinates 702D, 704D, such as in the manner described above with respect to FIG. 2 and/or FIG. 3. Since the line that starts at the first ordered pair of coordinates 702D and passes through, and/or ends at, the second ordered pair of coordinates 704D intersects, and/or shares a common point with, a horizontal edge of the square 700D, e.g. an edge of the square 700D that is parallel to the horizontal axis, the processor 102 determines that the intended scroll direction is the vertical direction.

In operation, with respect to FIG. 7E, the processor 102 may receive the first ordered pair of coordinates 702E and the second ordered pair of coordinates 704E and may construct the square 700E based on the received first and second ordered pair of coordinates 702E, 704E, such as in the manner described above with respect to FIG. 2 and/or FIG. 3. Since the line that starts at the first ordered pair of coordinates 702E and passes through, and/or ends at, the second ordered pair of coordinates 704E intersects, and/or shares a common point with, a vertical edge of the square 700E, e.g. an edge of the square 700E that is parallel to the vertical axis, the processor 102 determines that the intended scroll direction is the horizontal direction.

In operation, with respect to FIG. 7F, the processor 102 may receive the first ordered pair of coordinates 702F and the second ordered pair of coordinates 704F and may construct the square 700F based on the received first and second ordered pair of coordinates 702F, 704F, such as in the manner described above with respect to FIG. 2 and/or FIG. 3. Since the line that starts at the first ordered pair of coordinates 702F and passes through, and/or ends at, the second ordered pair of coordinates 704F intersects, and/or shares a common point with, a horizontal edge of the square 700F, e.g. an edge of the square 700F that is parallel to the horizontal axis, the processor 102 determines that the intended scroll direction is the vertical direction.

In operation, with respect to FIG. 7G, the processor 102 may receive the first ordered pair of coordinates 702G and the second ordered pair of coordinates 704G and may construct the square 700G based on the received first and second ordered pair of coordinates 702G, 704G, such as in the manner described above with respect to FIG. 2 and/or FIG. 3. Since the line that starts at the first ordered pair of coordinates 702G and passes through, and/or ends at, the second ordered pair of coordinates 704G intersects, and/or shares a common point with, a vertical edge of the square 700G, e.g. an edge of the square 700G that is parallel to the vertical axis, the processor 102 determines that the intended scroll direction is the horizontal direction.

In operation, with respect to FIG. 7H, the processor 102 may receive the first ordered pair of coordinates 702H and the second ordered pair of coordinates 704H and may construct the square 700H based on the received first and second ordered pair of coordinates 702H, 704H, such as in the manner described above with respect to FIG. 2 and/or FIG. 3. Since the line that starts at the first ordered pair of coordinates 702H and passes through, and/or ends at, the second ordered pair of coordinates 704H intersects, and/or shares a common point with, a horizontal edge of the square 700H, e.g. an edge of the square 700H that is parallel to the horizontal axis, the processor 102 determines that the intended scroll direction is the vertical direction.

Figure 8:
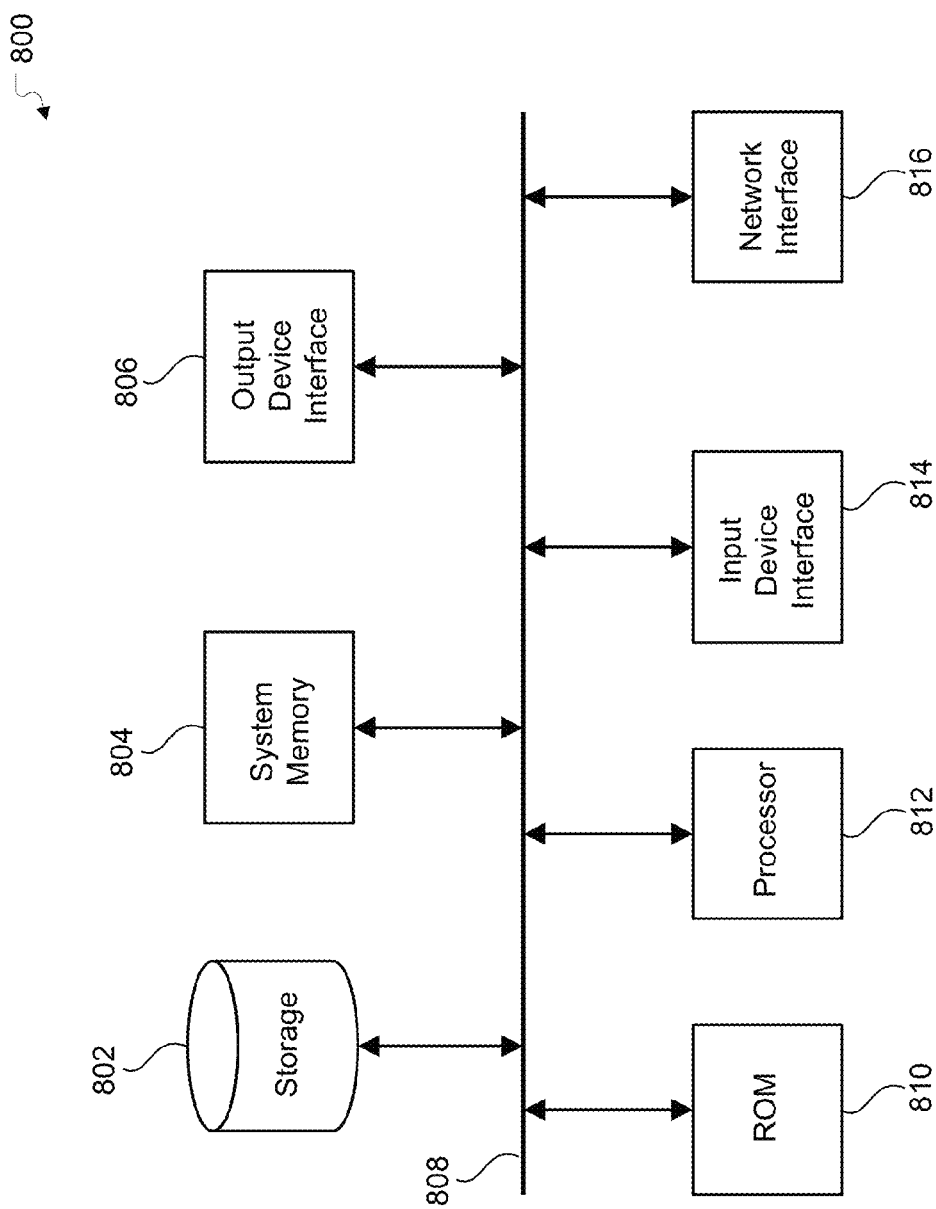
FIG. 8 conceptually illustrates an electronic system with which one or more implementations of the subject technology may be implemented.

FIG. 8 conceptually illustrates electronic system 800 with which any implementations of the subject technology may be implemented. Electronic system 800, for example, can be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 800 includes bus 808, processing unit(s) 812, system memory 804, read-only memory (ROM) 810, permanent storage device 802, input device interface 814, output device interface 806, and network interface 816, or subsets and variations thereof.

Bus 808 collectively represents all system, peripheral, and chipset buses that communicatively connect the numerous internal devices of electronic system 800. In one or more implementations, bus 808 communicatively connects processing unit(s) 812 with ROM 810, system memory 804, and permanent storage device 802. From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. One or more implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such as random access memory. System memory 804 stores any of the instructions and data that processing unit(s) 812 needs at runtime. In one or more implementations, the processes of the subject disclosure are stored in system memory 804, permanent storage device 802, and/or ROM 810. From these various memory units, processing unit(s) 812 retrieves instructions to execute and data to process in order to execute the processes of one or more implementations.

Bus 808 also connects to input and output device interfaces 814 and 806. Input device interface 814 enables a user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, bus 808 also couples electronic system 800 to a network (not shown) through network interface 816. In this manner, the computer can be a part of a network of computers (such as a local area network ("LAN"), a wide area network ("WAN"), or an Intranet, or a network of networks, such as the Internet. Any or all components of electronic system 800 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for determining scroll direction intent, the method comprising:
    receiving a first ordered pair of coordinates of a scroll event and a second ordered pair of coordinates of the scroll event;
    determining a first area of a first region of a square that is divided into the first region and a second region by a line segment comprising endpoints of the first ordered pair of coordinates and the second ordered pair of coordinates, wherein the square comprises a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates;
    determining a second area of the second region of the square;
    determining, by a processor, an intended scroll direction of the scroll event based at least in part on the first area of the first region and the second area of the second region; and
    providing the intended scroll direction of the scroll event.

2. The method of claim 1, wherein the first ordered pair of coordinates comprises starting coordinates of the scroll event and the second ordered pair of coordinates comprises ending coordinates of the scroll event.

3. The method of claim 1, wherein the first region comprises a first triangle and the second region comprises a rectangle and a second triangle that is equal in area to the first triangle.

4. The method of claim 3, wherein determining the first area of the first region and the second area of the second region further comprises:
    determining the first area of the first region based on an area of the first triangle; and
    determining the second area of the second region based on a sum of the area of the first triangle and an area of the rectangle.

5. The method of claim 1, wherein a vertical axis through the first ordered pair of coordinates comprises an edge of the first region.

6. The method of claim 5, wherein the determining, by the processor, the intended scroll direction of the scroll event based at least in part on the first area of the first region and the second area of the second region further comprises:
  determining that the intended scroll direction of the scroll event comprises a vertical direction when the second area of the second region is greater than the first area of the first region; and
  determining that the intended scroll direction of the scroll event comprises a horizontal direction when the first area of the first region is greater than the second area of the second region.

7. The method of claim 1, wherein the determining, by the processor, the intended scroll direction of the scroll event based at least in part on the first area of the first region and the second area of the second region further comprises:
  determining, by the processor, the intended scroll direction of the scroll event based at least in part on the first area of the first region, the second area of the second region, and at least one of: a content displayed on a device that generated the scroll event, an orientation of the device that generated the scroll event, or an output of a sensor of the device that generated the scroll event.

8. The method of claim 1, wherein the determining, by the processor, the intended scroll direction of the scroll event based at least in part on the first area of the first region and the second area of the second region further comprises:
  determining a ratio of the first area to the second area; and
  determining that the intended scroll direction of the scroll event comprises a vertical direction based at least in part on whether the ratio satisfies a threshold.

9. The method of claim 8, wherein the threshold is based at least in part on at least one of: a content displayed on a device that generated the scroll event, an orientation of the device that generated the scroll event, a gesture pattern of a user, or an output of a sensor of the device that generated the scroll event.

10. The method of claim 1, further comprising:
  normalizing the first ordered pair of coordinates and the second ordered pair of coordinates.

11. A system, comprising:
  one or more processors; and
  a memory including instructions that, when executed by the one or more processors, cause the one or more processors to:
    receive a first ordered pair of coordinates of a scroll event and a second ordered pair of coordinates of the scroll event;
    determine a first area of a first region of a square that is divided into the first region and a second region by a line segment comprising endpoints of the first ordered pair of coordinates and the second ordered pair of coordinates, wherein the square comprises a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates;
    determine a second area of the second region of the square;
    determine a ratio of the first area to the second area;
    determine an intended scroll direction of the scroll event based at least in part on whether the ratio satisfies a threshold; and
    provide the intended scroll direction of the scroll event.

12. The system of claim 11, wherein the system further comprises at least one of a display or a sensor, and the threshold is based at least in part on at least one of: a content displayed on the display, a gesture pattern of a user, an orientation of the system, or an output of the sensor.

13. The system of claim 12, wherein the sensor comprises at least one of a proximity sensor, a motion sensor, an ambient light sensor, a moisture sensor, or a gyroscope sensor.

14. The system of claim 11, further comprising:
  determining the threshold using a heuristic.

15. The system of claim 11, wherein a horizontal axis through the first ordered pair of coordinates comprises an edge of the second region.

16. The system of claim 15, wherein the memory further includes instructions that, when executed by the one or more processors, cause the one or more processors to:
  determine that the intended scroll direction of the scroll event comprises a horizontal direction when the ratio is greater than the threshold; and
  determine that the intended scroll direction of the scroll event comprises a vertical direction when the ratio is less than the threshold.

17. The system of claim 11, wherein the memory further includes instructions that, when executed by the one or more processors, cause the one or more processors to:
  normalize the first ordered pair of coordinates and the second ordered pair of coordinates.

18. A non-transitory machine readable medium embodying instructions that, when executed by a machine, cause the machine to perform a method for determining scroll direction intent, the method comprising:
  receiving a first ordered pair of coordinates of a scroll event and a second ordered pair of coordinates of the scroll event;
  constructing a square comprising a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates;
  dividing the square into a first region and a second region based on a line segment comprising endpoints of the first ordered pair of coordinates and the second ordered pair of coordinates;
  determining a first area of the first region and a second area of the second region;
  determining, by a processor, an intended scroll direction of the scroll event based at least in part on the first area of the first region and the second area of the second region; and
  providing the intended scroll direction of the scroll event.

19. The non-transitory machine readable medium of claim 18, wherein the first ordered pair of coordinates comprises starting coordinates of the scroll event and the second ordered pair of coordinates comprises ending coordinates of the scroll event.

20. The non-transitory machine readable medium of claim 18, wherein a vertical axis through the first ordered pair of coordinates comprises an edge of the first region.

21. The non-transitory machine readable medium of claim 20, wherein the determining the intended scroll direction of the scroll event based at least in part on the first area of the first region and the second area of the second region further comprises:

determining that the intended scroll direction of the scroll event comprises a vertical direction when the second area of the second region is larger than the first area of the first region; and determining that the intended scroll direction of the scroll event comprises a horizontal direction when the first area of the region is larger than the second area of the second region.

22. The non-transitory machine readable medium of claim 18, wherein the determining the intended scroll direction of the scroll event based at least in part on the first area of the first region and the second area of the second region further comprises:

determining the intended scroll direction of the scroll event based at least in part on the first area of the first region, the second area of the second region, and at least one of: a content displayed on the machine, an orientation of the machine, a gesture pattern of a user interacting with the machine, or an output of a sensor of the machine.

23. The non-transitory machine readable medium of claim 18, wherein the method further comprises:

normalizing the first ordered pair of coordinates and the second ordered pair of coordinates.

24. A method for determining scroll direction intent, the method comprising:

receiving a first ordered pair of coordinates of a scroll event and a second ordered pair of coordinates of the scroll event;

determining a square that is divided into a first region and a second region by a line segment comprising endpoints of the first ordered pair of coordinates and the second ordered pair of coordinates, the first region comprising a triangle and a rectangle that share a common edge, wherein the square comprises a first vertex at the first ordered pair of coordinates, a second vertex opposite to the first vertex at a third ordered pair of coordinates for which each coordinate has an absolute value that is equal to a maximum absolute coordinate value of the second ordered pair of coordinates, and a side that passes through the second ordered pair of coordinates;

determining, by a processor, an intended scroll direction of the scroll event based at least in part on a position of the rectangle of the first region relative to the common edge; and providing the intended scroll direction of the scroll event.

25. The method of claim 24, wherein the determining, by the processor, the intended scroll direction of the scroll event based at least in part on the position of the rectangle of the first region relative to the common edge further comprises:

determining, by the processor, that the intended scroll direction is a vertical direction when the rectangle of the first region is positioned to a right side or to a left side of the common edge.

26. The method of claim 24, wherein the determining, by the processor, the intended scroll direction of the scroll event based at least in part on the position of the rectangle of the first region relative to the common edge further comprises:

determining, by the processor, that the intended scroll direction is a horizontal direction when the rectangle of the first region is positioned above or below the common edge.

27. A method for determining scroll direction intent, the method comprising:

receiving a first ordered pair of coordinates of a scroll event and a second ordered pair of coordinates of the scroll event, the first ordered pair of coordinates characterized by a first pair of signs and the second ordered pair of coordinates characterized by a second pair of signs;

constructing a square comprising a first vertex at the first ordered pair of coordinates and a second vertex opposite to the first vertex at a third ordered pair of coordinates for which each coordinate has an absolute value that is equal to a maximum absolute coordinate value of the second ordered pair of coordinates, the third ordered pair of coordinates characterized by a third set of signs that are equivalent to the second set of signs;

determining, by a processor, an intended scroll direction of the scroll event based at least in part on a whether a line that passes through the first ordered pair of coordinates and the second ordered pair of coordinates intersects with a vertical edge of the square or a horizontal edge of the square; and providing the intended scroll direction of the scroll event.

28. The method of claim 27, further comprising:

normalizing the first ordered pair of coordinates and the second ordered pair of coordinates.

29. The method of claim 27, wherein the first ordered pair of coordinates comprises starting coordinates of the scroll event and the second ordered pair of coordinates comprises ending coordinates of the scroll event.

30. The method of claim 27, wherein the determining, by the processor, the intended scroll direction of the scroll event based at least in part on whether the line that passes through the first ordered pair of coordinates and the second ordered pair of coordinates intersects with the vertical edge of the square or the horizontal edge of the square further comprises:

determining that the intended scroll direction comprises a vertical scroll direction when the line that passes through the first ordered pair of coordinates and the second ordered pair of coordinates intersects with the horizontal edge of the square, otherwise determining that the intended scroll direction comprises a horizontal scroll direction.

31. The method of claim 27, wherein the determining, by the processor, the intended scroll direction of the scroll event based at least in part on whether the line that passes through the first ordered pair of coordinates and the second ordered pair of coordinates intersects with the vertical edge of the square or the horizontal edge of the square further comprises:

determining that the intended scroll direction comprises a horizontal scroll direction when the line that passes through the first ordered pair of coordinates and the second ordered pair of coordinates intersects with the vertical edge of the square, otherwise determining that the intended scroll direction comprises a vertical scroll direction.

32. The method of claim 27, further comprising causing displayed content to scroll in accordance with the determined intended scroll direction.

33. The method of claim 27, wherein the vertical edge of the square is parallel to a vertical axis and the horizontal edge of the square is parallel to a horizontal axis.

34. The method of claim 33, wherein first coordinates of the first, second, and third ordered pairs of coordinates comprise horizontal coordinates and second coordinates of the first, second, and third ordered pairs of coordinates comprise vertical coordinates.

* * * * *